US012317035B2

(12) United States Patent
Hansen et al.

(10) Patent No.: US 12,317,035 B2
(45) **Date of Patent: *May 27, 2025**

(54) HEARING DEVICE FOR OCCLUSION REDUCTION AND COMPONENTS THEREOF

(71) Applicant: GN Hearing A/S, Ballerup (DK)

(72) Inventors: Jonas Raun Hansen, Roskilde (DK); Jonathan Boley, Mundelein, IL (US)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,794

(22) Filed: May 9, 2023

(65) Prior Publication Data

US 2023/0276179 A1 Aug. 31, 2023

Related U.S. Application Data

(63) Continuation of application No. 17/380,022, filed on Jul. 20, 2021, now Pat. No. 11,765,521.

(30) Foreign Application Priority Data

Aug. 5, 2020 (DK) .......................... PA 2020 70513

(51) Int. Cl.
*H04R 25/02* (2006.01)
*H04R 25/00* (2006.01)

(52) U.S. Cl.
CPC ............ *H04R 25/02* (2013.01); *H04R 25/45* (2013.01); *H04R 2225/021* (2013.01)

(58) Field of Classification Search
None
See application file for complete search history.

(56) References Cited

U.S. PATENT DOCUMENTS

| | | | | |
|---|---|---|---|---|
| 11,765,521 B2 * | 9/2023 | Hansen | H04R 1/1016 381/330 |
| 2007/0009130 A1 | 1/2007 | Feeley et al. | |

(Continued)

FOREIGN PATENT DOCUMENTS

| | | |
|---|---|---|
| DE | 112006000463 | 2/2012 |
| EP | 1933589 | 6/2008 |

(Continued)

OTHER PUBLICATIONS

English machine translation of JP2009267454 (Watanuki et al.; Hearing Aid; published Nov. 2009) (Year: 2009).*

(Continued)

*Primary Examiner* — Mark Fischer
(74) *Attorney, Agent, or Firm* — Vista IP Law Group, LLP

(57) ABSTRACT

An earpiece includes: a first end; a second end opposite from the first end; a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel, wherein the first diaphragm extends in a direction that is parallel to, or that forms an acute angle with, a longitudinal axis of the first channel.

23 Claims, 8 Drawing Sheets

(56) References Cited

U.S. PATENT DOCUMENTS

| | | | | |
|---|---|---|---|---|
| 2008/0063223 | A1* | 3/2008 | van Halteren | H04R 1/24 381/182 |
| 2009/0310807 | A1 | 12/2009 | Van Halteren | |
| 2012/0008808 | A1* | 1/2012 | Saltykov | H04R 25/48 381/317 |
| 2013/0126262 | A1 | 5/2013 | Wilmink | |
| 2016/0212529 | A1 | 7/2016 | Epping | |
| 2018/0160213 | A1 | 6/2018 | Grinker | |
| 2018/0359578 | A1 | 12/2018 | Boley | |
| 2021/0076146 | A1* | 3/2021 | Naumann | H04R 25/505 |

FOREIGN PATENT DOCUMENTS

| | | | | |
|---|---|---|---|---|
| JP | 2009267454 | | 11/2009 | |
| JP | 2009267454 A | * | 11/2009 | |
| WO | WO 2006/090545 | | 8/2006 | |
| WO | WO 2014108373 | | 7/2014 | |
| WO | WO-2014108373 A1 | * | 7/2014 | H04R 1/2803 |
| WO | WO 2019/147131 | | 8/2019 | |

OTHER PUBLICATIONS

Final Office Action for U.S. Appl. No. 17/380,022 dated Jan. 25, 2023.

Non-Final Office Action for U.S. Appl. No. 17/380,022 dated Aug. 11, 2022.

Amendment Response to NFOA for U.S. Appl. No. 17/380,022 dated Dec. 8, 2022.

Amendment Response to FOA for U.S. Appl. No. 17/380,022 dated Apr. 3, 2023.

Notice of Allowance for U.S. Appl. No. 17/380,022 dated Apr. 27, 2023.

Foreign Office Action dated Nov. 5, 2020 for Danish Patent Application No. PA 2020 70513.

European search report for EP application No. 21185254.6 dated Jan. 4, 2022.

* cited by examiner

HEARING DEVICE FOR OCCLUSION REDUCTION AND COMPONENTS THEREOF

RELATED APPLICATION DATA

This application is a continuation of U.S. patent application Ser. No. 17/380,022 filed on Jul. 20, 2021, which claims priority to, and the benefit of, Danish Patent Application No. PA 2020 70513 filed on Aug. 5, 2020. The entire disclosures of the above applications are expressly incorporated by reference herein.

FIELD

The present disclosure relates to a hearing device, such as an earbud, a headset, a hearing aid, etc., with occlusion reduction capability.

BACKGROUND

Occlusion has for long been recognized as a problem for some hearing aid users, and continuous efforts have been made to reduce the occlusion effect.

Known solutions to reduce the occlusion effect provide a vent in the earpiece or earmold in order to allow pressure equalization between the ear canal and the surroundings.

Further, active occlusion reduction (AOR) systems have been developed. The AOC system has an ear canal microphone for detecting sound in the ear canal. The ear canal microphone is provided together with the receiver in an earpiece. Microphone signal from the ear canal microphone can be processed to reduce an effect of the occlusion.

SUMMARY

Despite the known solutions, there is still a need for improved occlusion reduction or cancellation in hearing devices.

For example, when a hearing aid is inserted into the ear, it will result in increased occlusion. Occlusion can be reduced either by having a vent, or by using an active occlusion reduction system (AOR) system to reduce or cancel out the voice of the user. Such a system may need a receiver (e.g., loudspeaker) that can produce a high Low Frequency (LF) output, in order to be able to reduce or cancel out the occlusion signal. A hearing aid may use a balanced armature receiver, which is power efficient. However, such solution may have limited low frequency capabilities, especially if there is a leak between the hearing aid and an ear canal, or if the hearing aid has a vent that is too small.

In some cases, a passive unit (e.g., a passive resonator/radiator) may be employed to unload the low frequency demands for the receiver. Besides improving the AOR functionality, the passive unit may also ensure a better LF capability of the system, which will improve LF performance, such as in music playback. To make such a system work, the resonance of the passive unit may be tuned to a low frequency (e.g., below 1000 Hz, below 200 Hz, in the range of 20 Hz-200 Hz, etc.). At such low frequencies, the passive unit may be required to move a lot of air compared to the receiver (e.g., more than twice the volume velocity may be needed).

In some cases, to implement such a passive unit, a diaphragm may be placed perpendicularly relative to an axis of an occlusion relieve vent of a hearing device to cover the vent. However, because the vent may have a small cross-sectional dimension, the diaphragm of such passive unit may not have sufficient diaphragm area to handle large excursion or air volume velocity.

Accordingly, an earpiece with unique diaphragm features is provided.

The earpiece includes: a first end; a second end opposite from the first end; a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel, wherein the first diaphragm extends in a direction that is parallel to, or that forms an acute angle with, a longitudinal axis of the first channel.

Optionally, the direction in which the first diaphragm extends forms a non-perpendicular angle with the longitudinal axis of the first channel.

Optionally, the first channel is configured to reduce an occlusion effect, and/or to provide pressure equalization between a first space in an ear canal and a second space outside the ear canal when the earpiece is worn by a user.

Optionally, the first diaphragm is made from silicone, expanded PTFE, aluminum, carbon, or a combination of two or more of the foregoing.

Optionally, the first surface of the diaphragm is water permeable, and wherein the second surface of the diaphragm is water impermeable.

Optionally, the first diaphragm is configured to cope with an air volume velocity that is 10 mm^3/s or less.

Optionally, the first diaphragm is a part of a unit that is configured for insertion into an opening of the earpiece.

Optionally, the unit comprises a tube having a first tube end, a second tube end, and a tube body extending between the first tube end and the second tube end, wherein the first tube end has a first partial cover, wherein the second tube end has a second partial cover, and wherein the first diaphragm is coupled between the first partial cover at the first tube end and the second partial cover at the second tube end.

Optionally, the unit is detachably coupled to a part of the earpiece.

Optionally, the earpiece further includes a second diaphragm.

Optionally, the earpiece further includes a second channel, wherein the second diaphragm extends in a direction that is parallel to, or that forms an acute angle with, a longitudinal axis of the second channel.

Optionally, the second channel is parallel to, or forms an acute angle with, the first channel.

Optionally, the first diaphragm and the second diaphragm are arranged in series along the longitudinal axis of the first channel.

Optionally, the first diaphragm and the second diaphragm are tuned to different respective ranges of resonance frequencies.

Optionally, the first diaphragm is tuned to a first resonance frequency corresponding with speech sound, and the second diaphragm is tuned to a second resonance frequency corresponding with non-speech sound.

Optionally, the first diaphragm is tuned to a first resonance frequency that is anywhere from 80 Hz to 1000 Hz, and the second diaphragm is tuned to a second resonance frequency that is anywhere below 80 Hz.

Optionally, the first diaphragm is tuned to a resonance frequency that is anywhere between 80 Hz to 1000 Hz.

Optionally, the earpiece is an earbud, or is a part of a headset.

Optionally, the earpiece is a hearing aid, or is a part of the hearing aid.

Optionally, the earpiece comprises an earmold.

Optionally, the earpiece is an in-the canal (ITC) earpiece, or an in-the-ear (ITE) earpiece.

Optionally, the earpiece further includes a receiver.

Optionally, the earpiece further includes a first microphone configured to receive sound from an environment, and a processing unit coupled to the first microphone, wherein the processing unit is configured to provide an output signal based on a microphone signal from the first microphone.

Optionally, the earpiece further includes a second microphone configured to receive ear canal sound, wherein the second microphone is a part of an active occlusion reduction system.

Optionally, the active occlusion reduction system is configured to be active above a threshold frequency, and the first diaphragm has a resonance frequency below the threshold frequency.

Optionally, the threshold frequency is 80 Hz.

Optionally, the processing unit comprises an occlusion reduction unit.

A hearing aid includes the earpiece, and a behind-the-ear (BTE) unit, wherein the BTE unit comprises a first microphone configured to receive sound from an environment, and a processing unit coupled to the first microphone.

Optionally, the hearing aid further includes a second microphone configured to receive ear canal sound, wherein the second microphone is a part of an active occlusion reduction system.

A hearing aid includes the earpiece, and a behind-the-ear (BTE) unit, wherein the BTE unit comprises a first microphone configured to receive sound from an environment, a processing unit coupled to the first microphone, and a receiver coupled to the processing unit.

A component for an earpiece, includes: a tube having a first tube end, a second tube end, and a tube body extending between the first tube end and the second tube end, wherein the first tube end has a first partial cover, wherein the second tube end has a second partial cover; and a diaphragm is coupled between the first partial cover at the first tube end and the second partial cover at the second tube end; wherein at least a part of the tube is sized and shaped for insertion into an opening of the earpiece.

Optionally, the diaphragm divides a lumen within the tube into a first space and a second space.

Optionally, the first space is for fluid communication with a channel in the earpiece when the tube is inserted into the opening of the earpiece.

Optionally, the first diaphragm is tuned to a resonance frequency.

Optionally, the resonance frequency of the first diaphragm is tuned by changing a mass of the first diaphragm.

Optionally, the resonance frequency of the first diaphragm is tuned by adding or removing a mass to form the first diaphragm.

Other and further aspects and features will be evident from reading the following detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1:
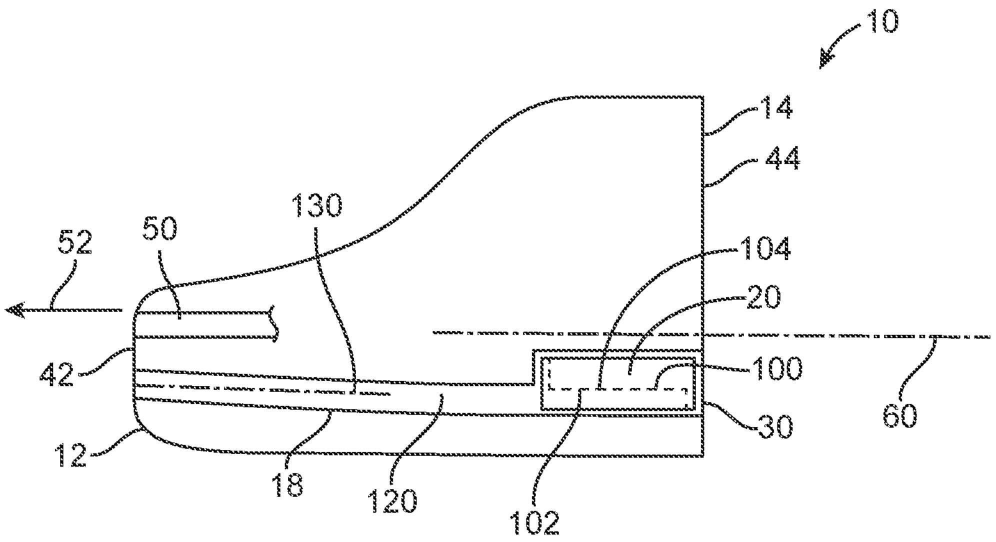
FIG. 1 illustrates an earpiece with a component having a diaphragm.

FIG. 1 illustrates an earpiece 10 with a component 20 having a diaphragm 100. In particular, the earpiece 10 includes a first end 12, and a second end 14 opposite from the first end 12. The earpiece 10 also has a first channel 18 extending from a first location that is closer to the first end 12 than to the second end 14, to a second location that is closer to the second end 14 than to the first end 12. The earpiece 10 also includes a component 20 with a first diaphragm 100. The first diaphragm 100 has a first surface 102 and a second surface 104 opposite the first surface 102. The first surface 102 of the diaphragm 100 is configured to be in fluid communication with a lumen 120 in the first channel 18.

As shown in the figure, the earpiece 10 has a first surface 42 configured to face towards an eardrum of a user of the earpiece 10, and a second surface 44 configured to face an environment outside the user. In some cases, the second surface 44 may be a part of an endplate for the earpiece 10. The first surface 42 may be a rectilinear surface or may be a curvilinear surface. Similarly, the second surface 44 may be a rectilinear surface or may be a curvilinear surface.

The earpiece 10 also includes an output 50 for outputting sound. The output 50 may be an opening, a sound channel, etc. In the case in which the output 50 is a sound channel, the channel may be defined by part(s) of a hearing device housing, by part(s) of a deformable structure (e.g., an eardome, a sleeve, etc.), or by a tube that is accommodated in the earpiece 10.

In the illustrated embodiments, the first diaphragm 100 extends in a direction that is parallel to a longitudinal axis 130 of the first channel 18. In other embodiments, the first diaphragm 100 may extend in a direction that forms a non-zero acute angle with the longitudinal axis 130 of the first channel 18. In some embodiments, the direction in which the first diaphragm 100 extends forms a non-perpendicular angle with the longitudinal axis 130 of the first channel 18.

The longitudinal axis 130 of the first channel 18 is illustrated as being parallel to an ear canal axis 60. In other embodiments, the longitudinal axis 130 of the first channel 18 may form a non-zero acute angle with respect to the ear canal axis 60. In some cases, the ear canal axis 60 may be parallel to an ear-to-ear axis of a user of the earpiece 10.

In the illustrated embodiments, the first channel 18 is configured to reduce an occlusion effect, and/or to provide pressure equalization between a first space in an ear canal and a second space outside the ear canal when the earpiece 10 is worn by a user.

The first diaphragm 100 may be made from any suitable material. For examples, in some embodiments, the first diaphragm 100 may be made from silicone, PTFE (e.g., expanded PTFE), aluminum, carbon, or a combination of two or more of the foregoing. In other embodiments, the first diaphragm 100 may be made from other materials in other embodiments.

In some embodiments, the first surface of the diaphragm 100 may be water permeable, and the second surface opposite from the first surface of the diaphragm 100 may be water impermeable In some embodiments, the first diaphragm 100 may be made from a mesh. In such cases, a first surface of the mesh may be water permeable, and a second surface opposite from the first surface of the mesh may be water impermeable.

In some embodiments, the first diaphragm 100 is configured to cope with an air volume velocity that is 10 mm^3/s or less. In other embodiments, the first diaphragm 100 is configured to cope with an air volume velocity that I higher than 10 mm^3/s.

In some embodiments, the first diaphragm 100 may be configured to have a resonance frequency. For example, in some embodiments, the first diaphragm 100 may be configured to have a first resonance frequency that is anywhere from 10 to 1000 Hz (e.g., anywhere from 10 to 100 Hz), or preferably anywhere from 80 to 1000 Hz. In other embodiments, the first diaphragm 100 may be configured to have a resonance frequency that is anywhere below 80 Hz (e.g., anywhere below: 50 Hz, 30 Hz, 10 Hz, 5 Hz, 1 Hz, etc.). In some cases, the first diaphragm 100 may be configured to have a resonance frequency that is 30 Hz+/−5 Hz. In other embodiments, the first diaphragm 100 may be configured to have different respective resonance frequencies that are different from the above examples. Also, in some embodiments, the first diaphragm 100 may be configured to have a resonance frequency that corresponds with speech sound. In other embodiments, the first diaphragm 100 may be configured to have a resonance frequency that corresponds with non-speech sound (such as chewing, walking, etc.).

In some embodiments, the diaphragm 100 is configured to have a certain resonance frequency by having a certain dimension(s) (e.g., length, width), thickness, material, or any combination of the foregoing. The diaphragm 100 may have an uniform thickness, or it may have a variable thickness in order for it to be tuned to have certain resonance frequency. Also, in some embodiments, materials adding mass/weight to the diaphragm 100 may be deposited on the diaphragm 100 to achieve certain resonance frequency for the diaphragm 100. In other embodiments, materials may be removed from the diaphragm 100 to change the mass of the diaphragm 100. In addition, in some embodiments, the diaphragm 100 may be made to have certain stiffness (e.g., bending stiffness) that corresponds with certain resonance frequency.

In some embodiments, the diaphragm 100 may have a two dimensional area that is larger than a cross-sectional area of the first channel 18. For example, if the first channel 18 has a circular cross section with a diameter of 3 mm, then the diaphragm 100 may have a two dimensional area that is larger than pi*1.5*1.5=7.07 mm^2. By means of non-limiting examples, the area of the diaphragm 100 may be at least 5%, at least 10%, at least 20%, at least 30%, etc., larger than the cross-sectional area of the first channel 18. In some embodiments, the diaphragm 100 may have a surface area that is anywhere from 2 mm^2 to 50 mm^2, such as an area that is larger than 7.1 mm^2.

During use of the earpiece 10, the earpiece 10 is inserted at least partly into an ear canal of a user of the earpiece 10. At least a circumferential part of the earpiece 10 forms a seal against a circumferential wall of the ear canal. The output 50 of the earpiece 10 provides sound for reception by an eardrum of the user. To address an occlusion effect associated with the user of the earpiece 10, the first channel 18 provides some pressure relief. The diaphragm 100 is configured to have certain resonance frequency or frequency range so that it will reflect sound waves at the resonance frequency or within the frequency range. In some embodiments, the diaphragm 100 is configured to reflect sound waves corresponding with speech, while allowing sound waves corresponding with non-speech to pass therethrough. In other embodiments, the diaphragm 100 may be configured to allow sound waves corresponding with speech to pass therethrough.

Figure 2A:
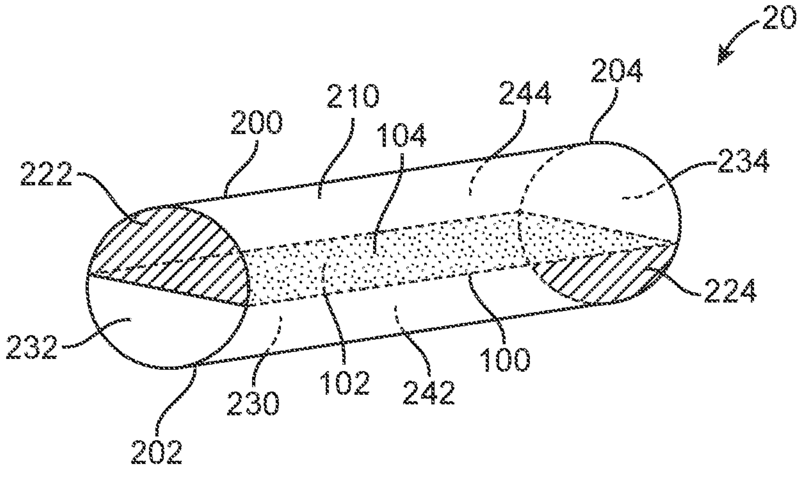
FIG. 2A illustrates the component of FIG. 1.

In the illustrated embodiments, the first diaphragm 100 is a part of the component 20 (a unit) that is configured for insertion into an opening 30 of the earpiece 10. The opening 30 may be located at a faceplate, or may be located at other part of the earpiece 10. As shown in FIG. 2A, the component (unit) 20 comprises a tube 200 having a first tube end 202, a second tube end 204, and a tube body 210 extending between the first tube end 202 and the second tube end 204. The first tube end 202 has a first partial cover 222, and the second tube end 204 has a second partial cover 224. As shown in the figure, the first diaphragm 100 is coupled between the first partial cover 222 at the first tube end 202 and the second partial cover 224 at the second tube end 204. The first diaphragm 100 has a first surface 102 and a second surface 104 opposite the first surface 102. The first diaphragm 100 divides a lumen 230 in the tube 200 into a first space 242 and a second space 244. The first space 242 is for fluid communication with the lumen 120 of the first channel 18 via a first opening 232 at the first tube end 202. The second space 244 is for fluid communication with an environment outside a user of the earpiece 10 via a second opening 234 at the second tube end 204.

Figure 2B:
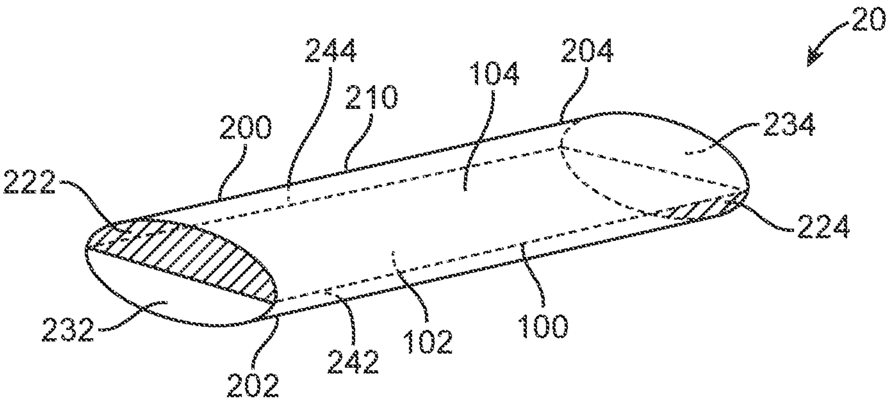
FIGS. 2B-2E illustrate variations of the component of FIG. 2A.
Figure 2C:
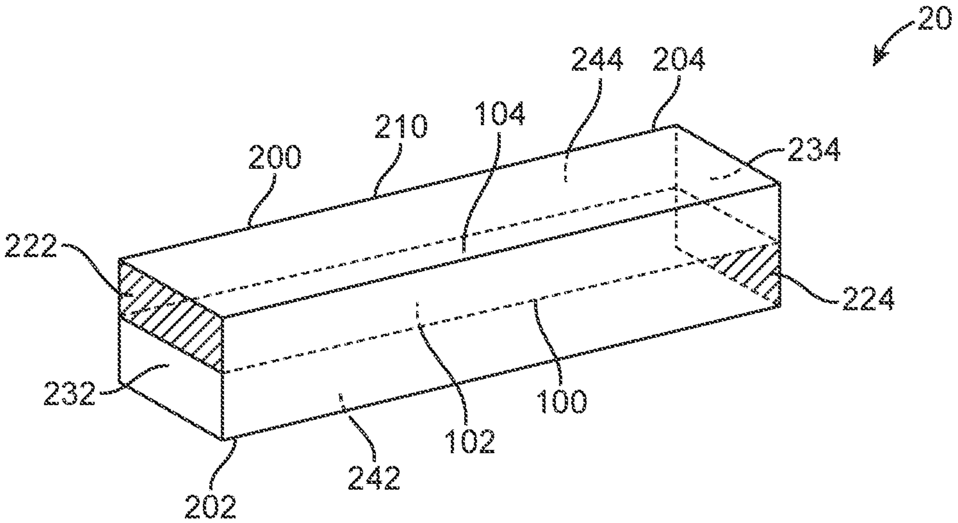
Figure 2D:
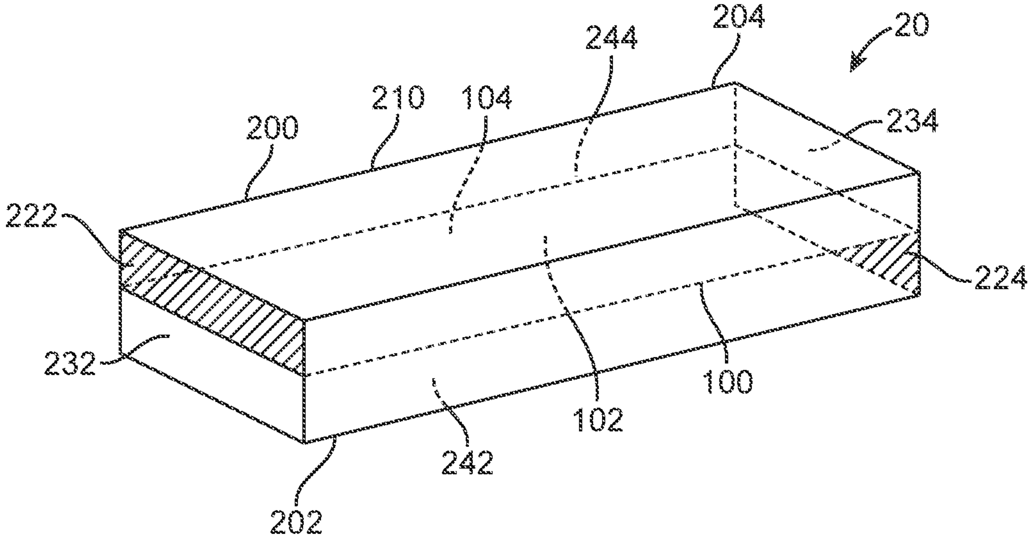
Figure 2E:
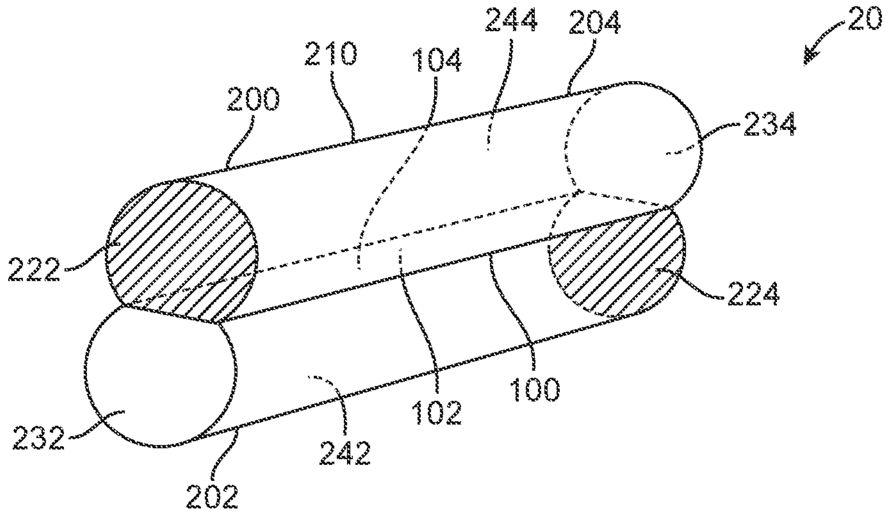

In the illustrated embodiments, the tube 200 has a circular cross-section. In other embodiments, the tube 200 may have other cross-sectional shapes. For example, in other embodiments, the cross-section of the tube 200 may be elliptical (FIG. 2B), square (FIG. 2C), rectangular (FIG. 2D), or may have a dumbbell or figure-8 shape (FIG. 2E), etc.

In some embodiments, the tube 200 may have a cross-sectional dimension that is larger than a cross-sectional dimension of the first channel 18. In other embodiments, the tube 200 may have a cross-sectional dimension that is the same as the cross-sectional dimension of the first channel 18. In further embodiments, the tube 200 may have a cross-sectional dimension that is smaller than a cross-sectional dimension of the first channel 18.

In the illustrated embodiments, the component 20 is detachably coupled to a part of the earpiece 10. This allows the component 20 to be replaced (e.g., by a user of the earpiece 10, by a hearing aid professional, or by a provider of the earpiece 10) if needed. In other embodiments, the component 20 may be permanently or temporarily secured within the earpiece 10. For example, during manufacturing, the component 20 may be inserted into the opening 30 of the earpiece 10, so that the first space 242 is in fluid communication with the lumen 120 of the first channel 18 via the first opening 232 at the first tube end 202. The component 20 may then be secured to one or more parts of the earpiece 10 using a connection, such as an adhesive, glue, a mechanical connector, etc. Examples of mechanical connector may include snap-fit connector, frictional connector, anchor, screw, etc.

In other embodiments, the component 20 may not include the tube 200. For example, in other embodiments, the component 20 may include the diaphragm 100 that is secured to one or more parts of the earpiece 10. Also, in other embodiments, the diaphragm 100 may be oriented to form a non-zero acute angle with respect to the longitudinal axis 130 of the first channel 18. The angle may be any angle that is larger than 0° and less than 45°.

In some embodiments, the component 20 may optionally further include a vent tube coupled to the tube 200. The vent tube may be sized and shaped for insertion into one or more components of the earpiece 10. The vent tube is configured to implement the first channel 18. In some embodiments, the vent tube is connected to the tube 200 via an adhesive or a mechanical connector. In other embodiments, the vent tube may extend from the tube 200, and the vent tube and the tube 200 may be formed together to have an unity configuration.

Figure 3:
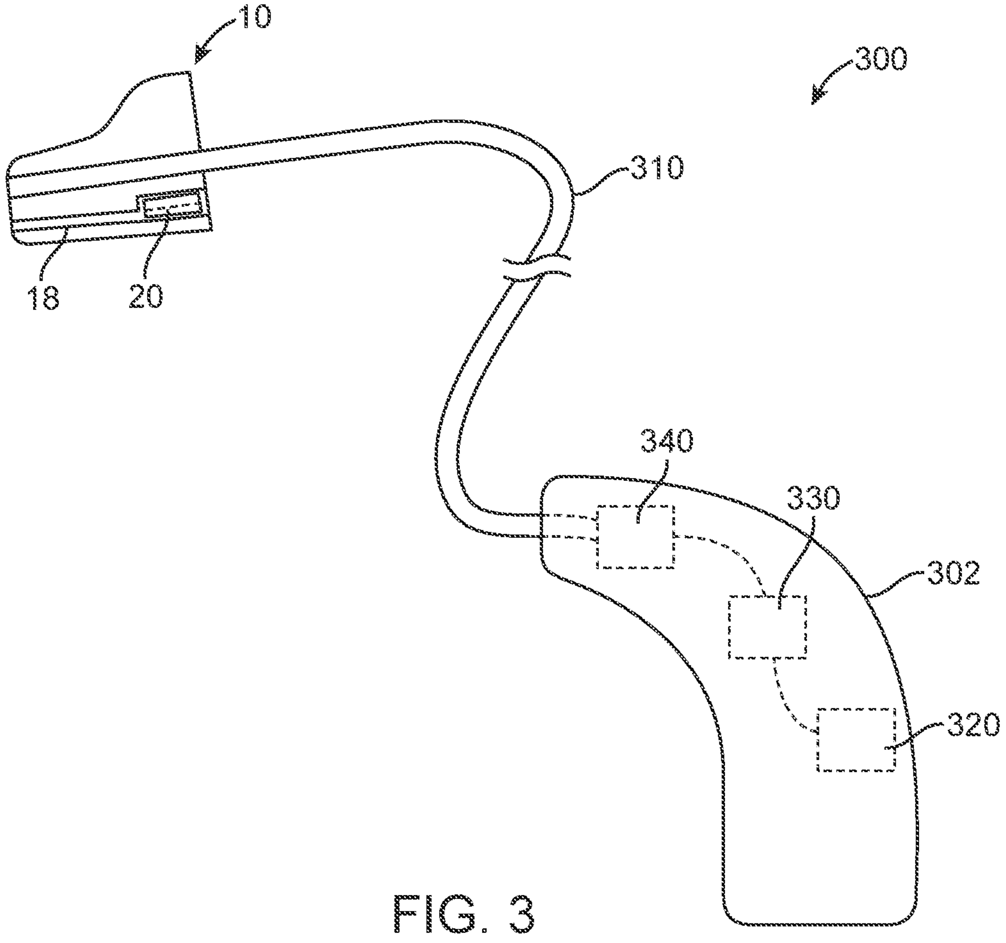
FIG. 3 illustrates a hearing aid having the earpiece of FIG. 1.

In some embodiments, the earpiece 10 may be a part of a hearing device, such as a hearing aid. For example, as shown in FIG. 3, the earpiece 10 may be a part of a hearing aid 300. The hearing aid 300 includes a behind-the-ear (BTE) unit 302 that comprises a microphone 320, a processing unit 330, and a receiver 340. The hearing aid 300 also includes an elongated connector 310 that is a sound tube with one end coupled to the BTE unit 302, and an opposite end coupled to the earpiece 10. The microphone 320 is configured to receive sound from an environment surrounding a user of the hearing aid 300, and provide a microphone signal based on the received sound. The processing unit 330 is configured to provide an output signal based on the microphone signal. The receiver 340 is configured to provide output sound based on the output signal from the processing unit 330. The sound tube 310 is configured to transmit the output sound from the BTE unit 302 to the earpiece 10.

Figure 4:
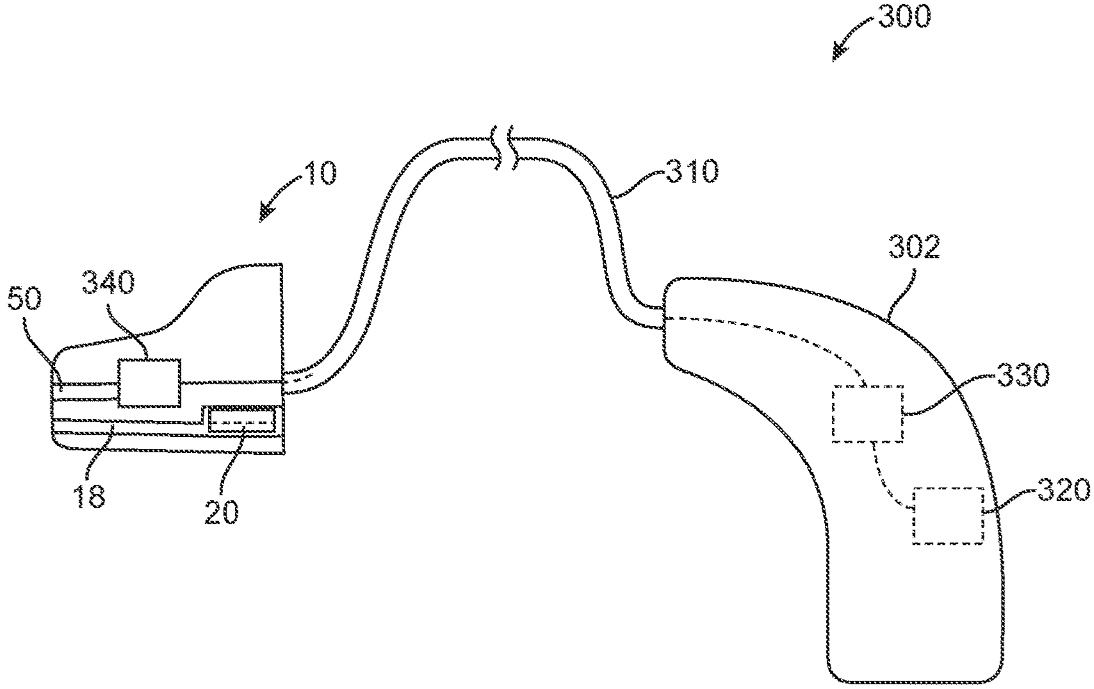
FIG. 4 illustrates a variation of the hearing aid of FIG. 3, particularly showing the earpiece having a receiver.

In other embodiments, the earpiece 10 may include the receiver 340 (FIG. 4). As shown in FIG. 4 the earpiece 10 may be a part of a hearing aid 300. The hearing aid 300 includes a behind-the-ear (BTE) unit 302 that comprises a microphone 320, and a processing unit 330. The hearing aid 300 also includes an elongated connector 310 that is cable (having electrical wires) with one end coupled to the BTE unit 302, and an opposite end coupled to the receiver 340 in the earpiece 10. The microphone 320 is configured to receive sound from an environment surrounding a user of the hearing aid 300, and provide a microphone signal based on the received sound. The processing unit 330 is configured to provide an output signal based on the microphone signal. The elongated connector 310 is configured to transmit the output sound from the BTE unit 302 to the receiver 340 in the earpiece 10. The receiver 340 is configured to provide output sound based on the output signal from the processing unit 330.

In some embodiments, the earpiece 10, the hearing aid 300 of FIG. 3, or the hearing aid 300 of FIG. 4 may optionally further include an additional microphone (e.g., ear canal microphone) configured to pick up sound within an ear canal. The microphone is configured to provide microphone signal for processing by the processing unit 330. The processing unit 330 is configured to provide active occlusion reduction to at least reduce an occlusion effect, and more preferably to eliminate the occlusion effect. In some cases, the processing unit 330 may include an occlusion reduction unit, wherein the microphone 600 and the occlusion reduction unit together form an active occlusion reduction system. The occlusion reduction unit of the processing unit 330 is configured to reduce an effect of the occlusion, or more preferably, to cancel the effect of the occlusion. The occlusion reduction unit is configured to treat the occlusion sound in the ear canal as an error in a closed-loop feedback system. In one implementation, the occlusion reduction unit uses the occlusion sound signals to generate anti-occlusion signals. A receiver may then be utilized to output anti-occlusion sound into the ear canal based on the anti-occlusion signals. The occlusion sounds in the ear canal are at least partially negated as they combine with the anti-occlusion sound provided by the earpiece 10. In some embodiments, the occlusion reduction unit may be implemented as an occlusion cancellation unit.

Figure 5:
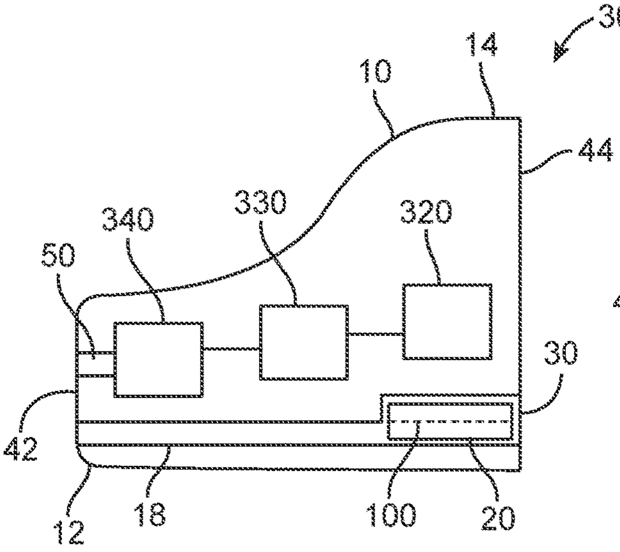
FIG. 5 illustrates a variation of the earpiece of FIG. 1, particularly showing the earpiece having a receiver, a processing unit, and a first microphone.

Also, in some embodiments, the earpiece 10 itself may be a hearing device 300, such as a hearing aid. For example, as shown in FIG. 5, the earpiece 10 may include a microphone 320, and a processing unit 330, and a receiver 340. The microphone 320 is configured to receive sound from an environment surrounding a user of the hearing aid 300, and provide a microphone signal based on the received sound. The processing unit 330 is configured to provide an output signal based on the microphone signal. The receiver 340 is configured to provide output sound based on the output signal from the processing unit 330.

Figure 6:
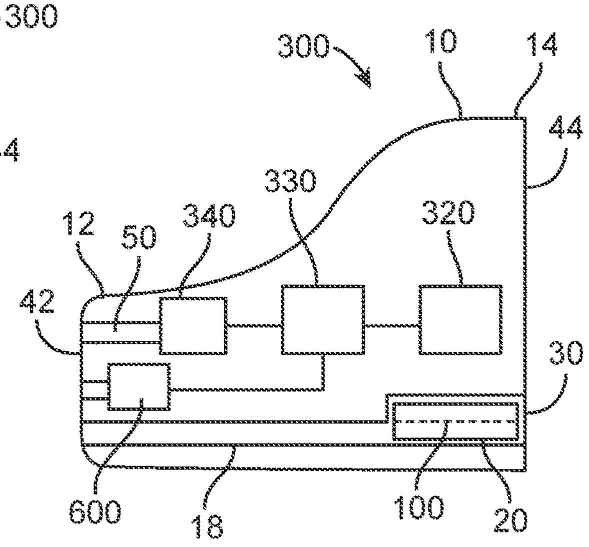
FIG. 6 illustrates a variation of the earpiece of FIG. 1, particularly showing the earpiece having a receiver, a processing unit, a first microphone, and a second microphone.

In some embodiments, the earpiece 10/hearing device 300 of FIG. 5 may optionally further include an additional microphone 600 (e.g., ear canal microphone) configured to pick up sound within an ear canal (FIG. 6). The microphone 600 is configured to provide microphone signal for processing by the processing unit 330. The processing unit 330 is configured to provide active occlusion reduction to at least reduce an occlusion effect, and more preferably to eliminate the occlusion effect. In some cases, the processing unit 330 may include an occlusion reduction unit, wherein the microphone 600 and the occlusion reduction unit together form an active occlusion reduction system. Also, in some embodiments, a receiver of the earpiece 10/hearing device 300 may be considered to be a component of the active occlusion reduction system. The occlusion reduction unit of the processing unit 330 is configured to reduce an effect of the occlusion, or more preferably, to cancel the effect of the occlusion. In some embodiments, the occlusion reduction unit may be implemented as an occlusion cancellation unit.

In some embodiments, the active occlusion reduction system may be configured to be active (e.g., to provide occlusion reduction) above a certain threshold frequency, and the first diaphragm 100 may be configured to have a resonance frequency below the threshold frequency. In some embodiments, the threshold frequency may be below 200 Hz, such as below 100 Hz (e.g., 80 Hz). In other embodiments, the threshold frequency may be other values.

It should be noted that in the embodiments in which the earpiece 10/hearing device 300 includes an occlusion reduction unit for providing active occlusion reduction (or more preferably active occlusion cancellation), the diaphragm 100 is advantageous. In particular, because the diaphragm 100 is not perpendicular to the longitudinal axis of the channel 18, the diaphragm 100 can be made to have a larger diaphragm area (i.e., larger than the cross-sectional area of the channel 18). This technical feature helps to unload the receiver in the AOC system. This is because due to the larger diaphragm surface area, the diaphragm 100 will be able to handle large excursion or air volume velocity. As a result, the receiver may not be required to produce a high LF output to reduce or cancel out the occlusion signal. Additionally, the air mass in front and back of the diaphragm 100 will be larger (compared to a design in which the diaphragm 100 is oriented perpendicularly relative to the longitudinal axis of the channel 18), which makes it easier to tune the diaphragm 100 to a low resonance frequency without the need to provide a diaphragm suspension that is too compliant. Furthermore, the component 20 described herein is advantageous because it provides protection for the diaphragm 100.

In some embodiments, if the component 20 is not inserted into the opening 30 of the earpiece 10, the earpiece 10 or the hearing device 300 with the earpiece 10 will still work (like a normal hearing device), but with reduced LF capability.

In one or more embodiments described herein (e.g., in the embodiment of FIG. 1, 3, 4, 5, or 6), the earpiece 10 or the hearing aid 300 may optionally include two microphones for detecting environmental sound, wherein the two microphones are configured to detect the directionality of the received sound.

In one or more embodiments described herein (e.g., in the embodiment of FIG. 1, 3, 4, 5, or 6), the earpiece 10 or the hearing aid 300 may optionally include one or more antennas. For example, the earpiece 10 may have an antenna for communication with an accessory device, such as a cellular phone, a tablet, a computer, a laptop, a MP3 player, a watch, a vehicle, etc. Alternatively or additionally, the earpiece 10 may include an antenna for communication with another earpiece. In some embodiments, a hearing system may include a first earpiece 10 and a second earpiece 10. One of the earpieces 10 is configured for worn at a first ear of a user, and the other one of the earpieces 10 is configured for worn at a second ear of the user. In such cases, the earpieces 10 may be configured to communicate with each other via respective antennas.

Also, in one or more embodiments described herein, the processing unit 330 may be implemented using hardware, software, or a combination of both. Examples of hardware that may be used to implement the processing unit 330 include processor, amplifier, capacitor, resistor, integrated circuit, or any combination of the foregoing. In some embodiments, the processing unit 330 may have hearing loss compensation capability. For example, in some embodiments, the processing unit 330 may include a hearing loss compensation unit configured to perform signal processing to compensate for a hearing loss of a user. In other embodiments, the processing unit 330 may not have any hearing loss compensation capability. Also, in some embodiments, the processing unit 330 may include a noise reduction unit.

Figure 7A:
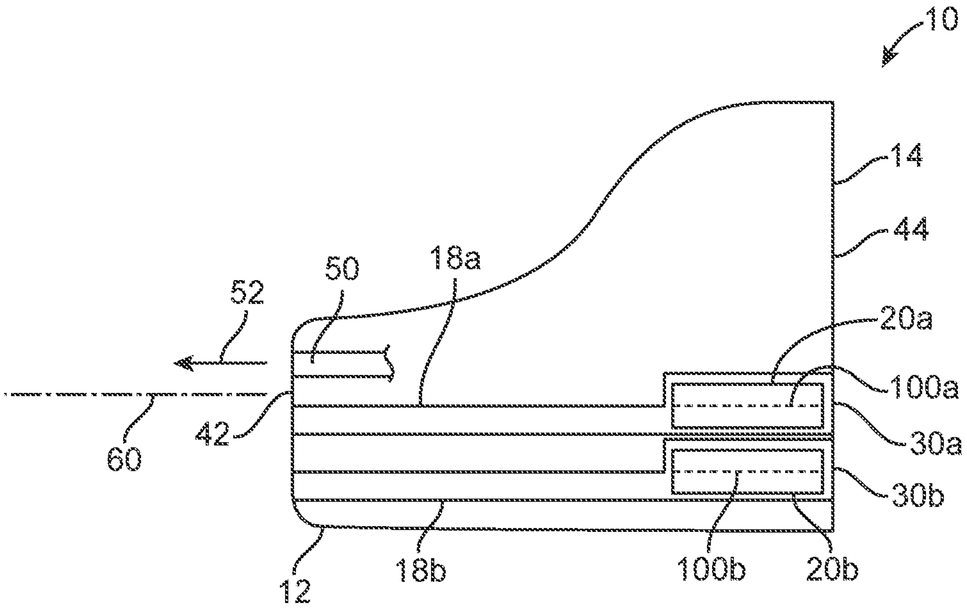
FIG. 7A illustrates a variation of the earpiece of FIG. 1, particularly showing the earpiece having two diaphragms arranged in parallel.

In some embodiments, the earpiece 10 may include two diaphragms 100. For example, as shown in FIG. 7A, the earpiece 10 may include a first channel 18*a* and a second channel 18*b*. In such cases, the earpiece 10 includes a first diaphragm 100*a* and a second diaphragm 100*b*. The first diaphragm 100*a* has one surface that is in fluid communication with the lumen of the first channel 18*a*, and an opposite surface that is in fluid communication with the environment outside a user of the earpiece 10 (e.g., the environment lateral with respect to the end 14). The second diaphragm 100*b* has one surface that is in fluid communication with the lumen of the first channel 18*b*, and an opposite surface that is in fluid communication with the environment outside a user of the earpiece 10 (e.g., the environment lateral with respect to the end 14). As shown in the figure, the first diaphragm 100*a* and the second diaphragm 100*b* may be implemented as respective parts of the components 20*a*, 20*b*, which are configured for insertion into respective openings 30*a*, 30*b* of the earpiece 10. In the illustrated embodiments, the first diaphragm 100*a* and the second diaphragm 100*b* are arranged in parallel in the sense that they operate in parallel to counteract respective sound pressures or ranges of sound pressures from within an ear canal. In some embodiments, the first diaphragm 100*a* may be configured to have a first resonance frequency, and the second diaphragm 100*b* may be configured to have a second resonance frequency that is different from the first frequency. For example, in some embodiments, the first diaphragm 100*a* may be configured to have a first resonance frequency that is anywhere from 80 to 1000 Hz, and the second diaphragm 100*b* may be configured to have a second resonance frequency that is anywhere below 80 Hz (e.g., anywhere below: 50 Hz, 30 Hz, 10 Hz, 5 Hz, 1 Hz, etc.). In other embodiments, the first diaphragm 100*a* and the second diaphragm 100*b* may be configured to have different respective resonance frequencies that are different from the above examples. Also, in some embodiments, the first diaphragm 100*a* may be configured to have a first resonance frequency that corresponds with speech sound, and the second diaphragm 100*b* may be configured to have a second resonance frequency that corresponds with non-speech sound (such as chewing, walking, etc.).

In the illustrated embodiments, the components 20*a*, 20*b* are identical to each other. In other embodiments, the components 20*a*, 20*b* may be different from each other. For example, in other embodiments, the first diaphragm 100*a* and the second diaphragm 100*b* may have different physical attributes, such as different dimensions (e.g., length, width, etc.), different thicknesses, different materials, different shapes, etc. Also, in some embodiments, the components 20*a*, 20*b* may have different configurations (e.g., different shapes, dimensions, etc.).

As shown in FIG. 7A, the first diaphragm 100*a* and the second diaphragm 100*b* are physically parallel to each other. In other embodiments, the first diaphragm 100*a* and the second diaphragm 100*b* may form a non-zero angle with respect to each other. For example, in other embodiments, the first diaphragm 100*a* and the second diaphragm 100*b* may form an acute angle. In further embodiments, the first diaphragm 100*a* and the second diaphragm 100*b* may form a perpendicular angle. For example, in other embodiments, the second diaphragm 100*b* may be rotated 90° so that it is perpendicular to the longitudinal axis of the second channel 18*b*. In such cases, the second diaphragm 100*b* may be sized smaller to cover the opening of the second channel 18*b*.

Also, as shown in FIG. 7A, the first channel 18*a* and the second channel 18*b* are parallel to each other. In other embodiments, the second channel 18*b* may form an acute angle (that is greater than 0°) with the first channel 18*a*.

The first channel 18*a* and/or the second channel 18*b* may correspond to the ear-canal axis 60. For example, the first channel 18*a* and/or the second channel 18*b* may be parallel to, or may form a non-zero acute angle with, the ear-canal axis 60.

Figure 7B:
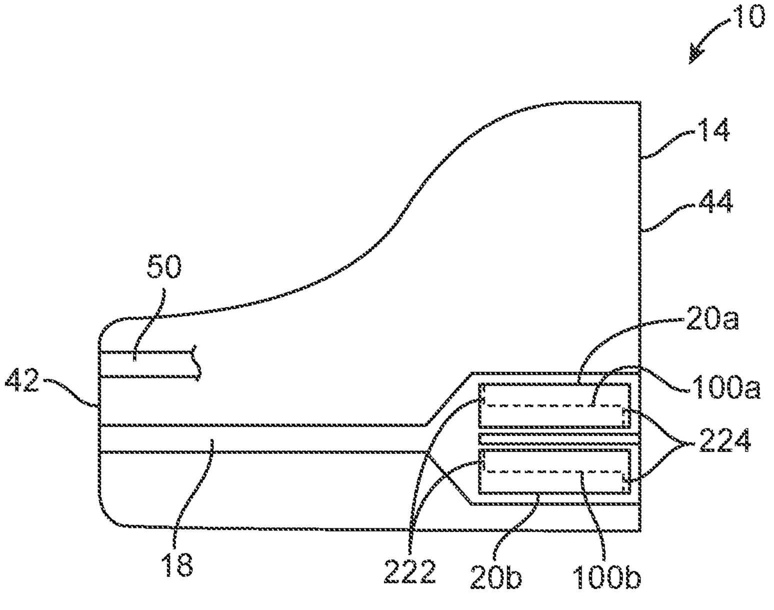
FIG. 7B illustrates another variation of the earpiece of FIG. 1, particularly showing the earpiece having two diaphragms arranged in parallel.

FIG. 7B illustrates another variation of the earpiece of FIG. 1, particularly showing the earpiece having two diaphragms 100*a*, 100*b* arranged in parallel. The embodiments of FIG. 7B are similar to that of FIG. 7A, except that the diaphragms 100*a*, 100*b* are associated with the same first channel 18. In particular, the diaphragms 100*a*, 100*b* are both in fluid communication with the same first channel 18. In some embodiments, the diaphragms 100*a*, 100*b* may be respective parts of components that are inserted into respective openings of the earpiece 10. In other embodiments, the diaphragms 100*a*, 100*b* may be parts of a same component that is inserted into an opening of the earpiece 10.

In other embodiments, the first diaphragm 100*a* and the second diaphragm 100*b* may be arranged in series so that they operate in series with respect to each other. For example, as shown in FIG. 8, the earpiece 10 may include a channel 18, and the first diaphragm 100*a* and the second diaphragm 100*b* are arranged in series along the longitudinal axis of the channel 18.

As shown in the figure, the first diaphragm 100*a* and the second diaphragm 100*b* may be implemented as respective parts of the components 20*a*, 20*b*, which are configured for insertion into the opening 30 of the earpiece 10 one after the other. The first diaphragm 100*a* of the first component 20*a* has one surface 102*a* that is in fluid communication with the lumen of the channel 18 via the opening 232 of the first component 20*a*, and an opposite surface 104*a* that is in fluid communication with a space in the second component 20*b* via the opening 234 of the first component 20*a*. The second diaphragm 100*b* of the second component 20*b* has a surface 102*b* that is in fluid communication with a space in the first component 20*a* via the opening 232 of the second component 20*b*, and an opposite surface 104*b* that is in fluid communication with the environment outside a user of the earpiece 10 (e.g., the environment lateral with respect to the end 14) via the opening 234 of the second component 20*b*. Accordingly, during use, sound pressure from within the ear canal will enter into the second component 20*b* via the opening 234 of the second component 20*b*. Part of the sound pressure will be filtered out by the second diaphragm 100*b*, and other part of the sound pressure will pass through the second diaphragm 100*b*, will exit through the opening 232 of the second component 20*b*, and will enter into the first component 20*a* via the opening 234 of the first component 20*a*. This other part of the sound pressure will at least partially be filtered out by the first diaphragm 100*a*. Any remaining sound pressure not filtered by the first diaphragm 100*a* will exit the first component 20*a* via the opening 232 of the first component 20*a* into the channel 18.

Figure 8:
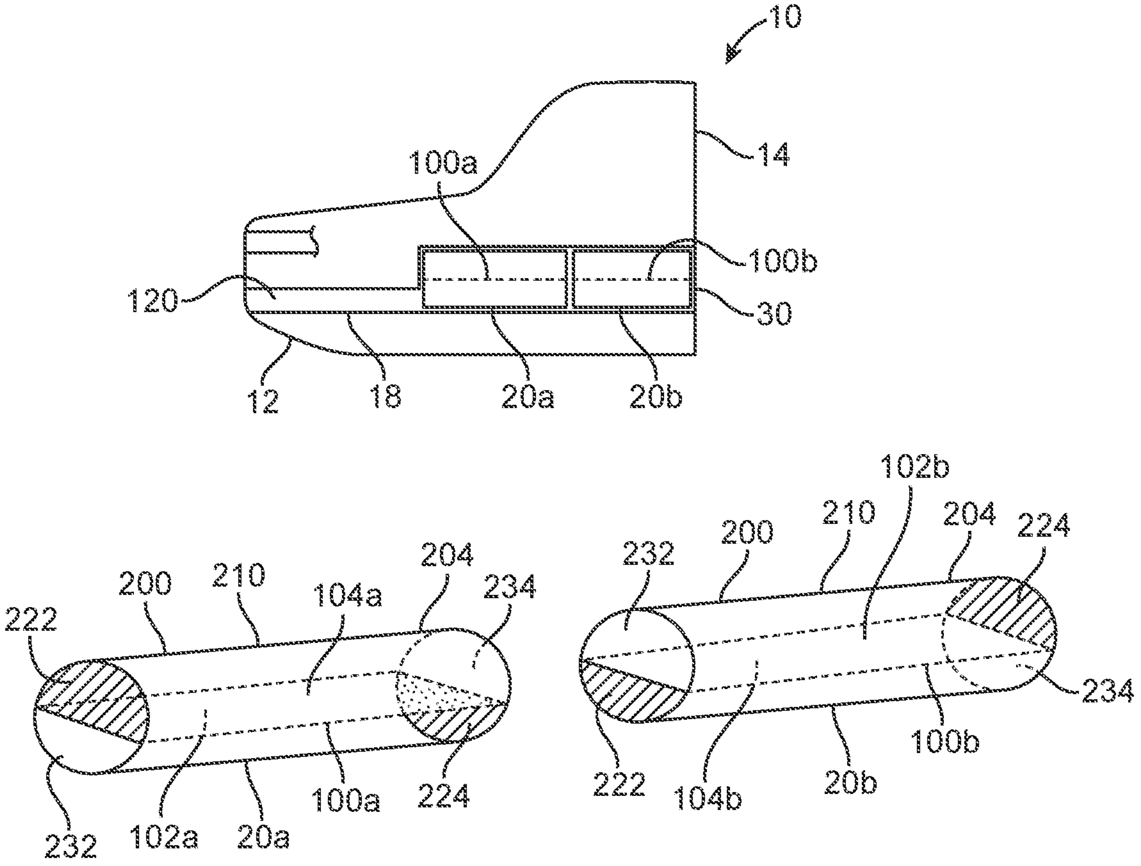
FIG. 8 illustrates a variation of the earpiece of FIG. 1, particularly showing the earpiece having two diaphragms arranged in series.

In the illustrated embodiments of FIG. 8, the first diaphragm 100*a* and the second diaphragm 100*b* are arranged in series in the sense that they operate in series to counteract respective sound pressures or ranges of sound pressures from within an ear canal. In some embodiments, the first diaphragm 100*a* may be configured to have a first resonance frequency, and the second diaphragm 100*b* may be configured to have a second resonance frequency that is different from the first frequency. For example, in some embodiments, the first diaphragm 100*a* may be configured to have a first resonance frequency that is anywhere from 80 to 1000 Hz, and the second diaphragm 100*b* may be configured to have a second resonance frequency that is anywhere below 80 Hz (e.g., anywhere below: 50 Hz, 30 Hz, 10 Hz, 5 Hz, 1 Hz, etc.), or vice versa. In other embodiments, the first diaphragm 100*a* and the second diaphragm 100*b* may be configured to have different respective resonance frequencies that are different from the above examples. Also, in some embodiments, the first diaphragm 100*a* may be configured to have a first resonance frequency that corresponds with speech sound, and the second diaphragm 100*b* may be configured to have a second resonance frequency that corresponds with non-speech sound (such as chewing, walking, etc.), or vice versa.

In the illustrated embodiments, the components 20*a*, 20*b* are identical to each other. In other embodiments, the components 20*a*, 20*b* may be different from each other. For example, in other embodiments, the first diaphragm 100*a* and the second diaphragm 100*b* may have different physical attributes, such as different dimensions (e.g., length, width, etc.), different thicknesses, different materials, different shapes, etc. Also, in some embodiments, the components 20*a*, 20*b* may have different configurations (e.g., different shapes, dimensions, etc.).

As shown in FIG. 8, the first diaphragm 100*a* and the second diaphragm 100*b* are physically parallel to each other. In other embodiments, the first diaphragm 100*a* and the second diaphragm 100*b* may form a non-zero angle with respect to each other. For example, in other embodiments, the first diaphragm 100*a* and the second diaphragm 100*b* may form an acute angle.

In other embodiments, the earpiece 10 may include more than two diaphragms 100*a*, 100*b*. For example, in other embodiments, the earpiece 10 may include three diaphragms 100 arranged in parallel or in series. If the diaphragms 100 are arranged in parallel, then they are configured to be in fluid communication with respective channels in the earpiece 10. The three diaphragms may be configured to have different respective resonance frequencies. Alternatively, two or more of the diaphragms may be configured to have the same resonance frequency.

It should be noted that the earpiece 10 may have different shapes and form factors in different embodiments. In some embodiments, the earpiece 10 may have an earmold (like that shown in FIG. 1), which may be a standardized earmold, or a custom earmold.

Figure 9:
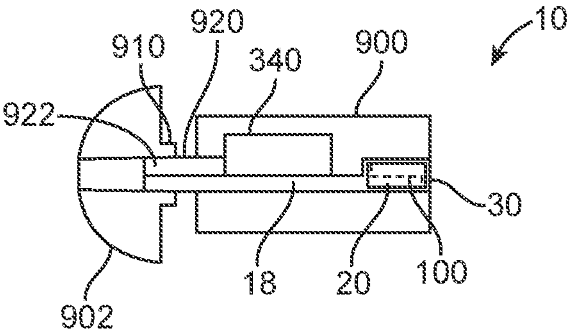
FIG. 9 illustrates a variation of the earpiece of FIG. 1.

In other embodiments, the earpiece 10 may not include an earmold. For example, in other embodiments, the earpiece 10 may include a housing 900 (e.g., a hearing device housing, a hearing aid housing, a receiver housing, etc.) containing a receiver 340, and a deformable eardome 902 coupled to the receiver housing 900 (FIG. 9). The eardome 902 may have a cylindrical section 910 configured to couple to a tube 920 extending from the receiver housing 900. In other embodiments, the eardome 902 may surrounds at least a part of the housing 900, or an entirety of the housing 900. The tube 920 may have a channel 922 for outputting sound from the receiver 340, and a channel 18 for pressure equalization and/or occlusion reduction. At least part of the channel 18 is accommodated in the housing 900. The component 20 with the diaphragm 100 is also shown. In other embodiments, at least part of the channel 18 may be implemented in a wall of the housing 900.

During use, the housing 900 with the eardome 902 is inserted into an ear canal of a user. The eardome 902 is deformable to conform to a shape of the ear canal, and provides a seal against a circumferential wall of the era canal. In some embodiments, the housing 900 may be configured to be at least partially placed in the ear canal. In other embodiments, the housing 900 may be configured to be placed completely in the ear canal. In further embodiments, the housing 900 may be placed in the ear canal so that it appears invisible. The receiver 340 is configured to generate sound that is output into the ear canal via the channel 922. Sound pressure and/or occlusion effect may be relieved or reduced via the channel 18.

In some embodiments, the earpiece 10 itself may be an in-the-canal (ITC) hearing device, completely-in-canal (CIC) hearing device, or invisible-in-the-canal (IIC) hearing device. The hearing device may be a hearing aid, an earbud for listening to media, a communication device, or a part of a headset.

In some embodiments, the earpiece 10 of FIG. 9 may further include a microphone 320 and a processing unit 330, like that described with reference to FIG. 5. The microphone 320 and the processing unit 330 may be contained in the housing 900. The processing unit 330 is configured to provide hearing loss compensation. Also, in some embodiments, the earpiece 10 may further include an additional microphone (an ear canal microphone) for receiving sound from inside the ear canal, like that described with reference to FIG. 6. In such cases, the processing unit 330 may optionally further include an occlusion reduction unit configured to provide active occlusion reduction to at least reduce an occlusion effect, and more preferably, to cancel an occlusion effect.

In addition, in some embodiments, the earpiece of FIG. 9 may be a part of a hearing aid that includes a BTE unit, like that described with reference to FIG. 4. In such cases, the receiver housing 900 may be connected to the BTE unit 302 via a cable 310 (FIG. 10), which contains wires connecting to the receiver 340. The BTE unit 302 includes a microphone 320 and a processing unit 330. The microphone 320 is configured to receive sound from an environment, and the processing unit 330 is configured to generate an output signal based on microphone signal from the microphone 320. The processing unit 330 may be configured to provide hearing loss compensation. The receiver 340 is configured to generate output sound based on the output signal from the processing unit 330. The hearing aid may be a receiver-in-the-ear (RITE) hearing aid, or a receiver-in-canal (RIC) hearing aid.

It should be noted that the earpiece 10 is not limited to having the configurations shown in the above examples, and that the earpiece 10 may have other configurations in other embodiments.

Also, in the above embodiments, the component 20 is described as having a diaphragm 100. In other embodiments, the component 20 may include multiple diaphragms 100, such as two diaphragms, three diaphragms, four diaphragms, etc. The diaphragms 100 may be arranged in the component 20 so that they are parallel to each other. Alternatively, two or more of the diaphragms 100 in the component 20 may form a non-zero acute angle. The component 20 may have a housing configured to house the plurality of diaphragms 100.

Figure 11:
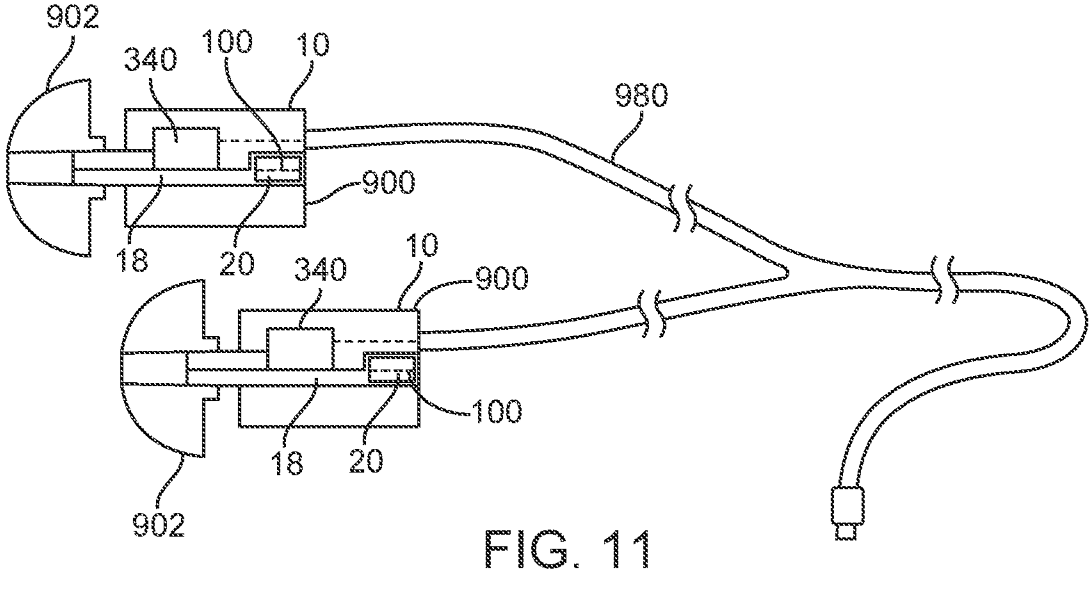
FIG. 11 illustrates a hearing device having two earpieces.

In further embodiments, the hearing device 300 may be a headset, and the earpiece 10 may be part of the headset. For example as shown in FIG. 11, the hearing device 300 may include two earpieces 10, and a Y-cable 980 connecting to the two earpieces 10. The cable 980 has a connector configured to couple to an accessory device, such as a cellular phone, a tablet, a computer, a laptop, a MP3 player, a watch, a vehicle, etc. In other embodiments, instead of having the cable 980, the two earpieces 10 of the headset may be physically unconnected. In such cases, each earpiece 10 may include an antenna (e.g., a Bluetooth antenna) configured to communicate with an accessory device and/or another earpiece 10.

Figure 10:
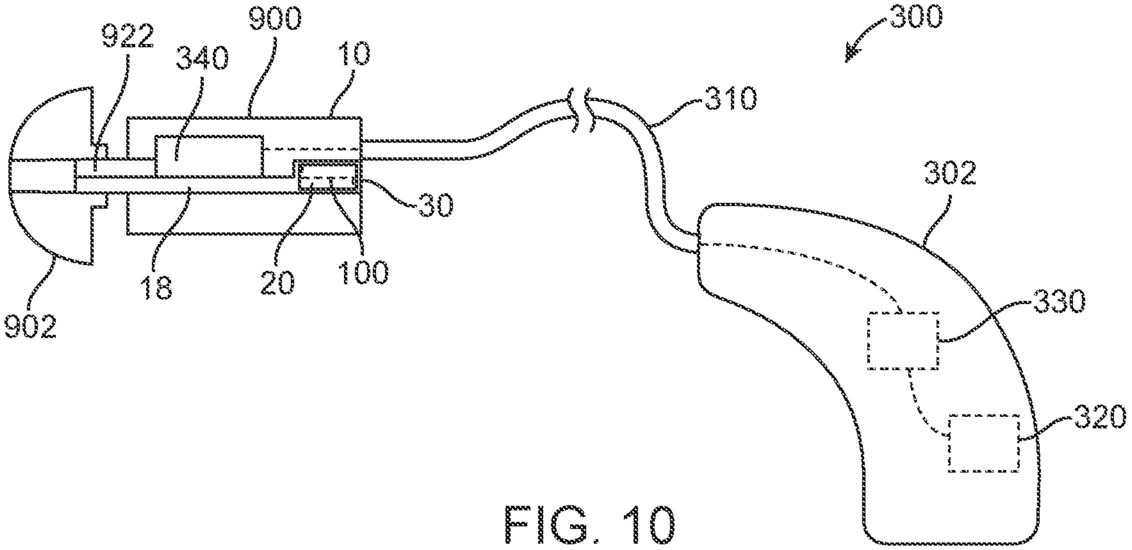
FIG. 10 illustrates a variation of the hearing device of FIG. 4.

In any of the embodiments of FIGS. 9-11, the earpiece 10 may optionally further include a microphone (an ear canal microphone) for detecting sound inside the ear canal, and a processing unit configured to provide occlusion reduction, like that described with reference to FIG. 6.

In any of the embodiments described herein, the channel 18 may be configured to function as a pressure equalization channel. For example, in some embodiments, when the component 20 is not inserted into the opening 30 of the earpiece 10, then the channel 18 may function as an unblocked vent to equalize pressures between the ear canal and the external environment.

Figure 12A:
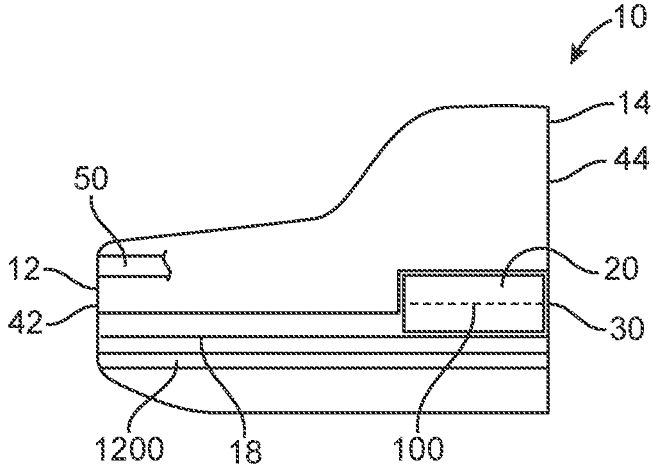
FIGS. 12A-12D illustrates techniques for implementing pressure equalization.

In other embodiments, any of the earpiece 10 described herein may include a pressure equalization channel 1200 that is in addition to the channel 18 (FIG. 12A). In such cases, the channel 18 is not used for pressure equalization, or may be configured to provide only partial pressure equalization. The pressure equalization channel 1200 is configured to provide pressure equalization between the ear canal and the external environment. The equalization channel may 1200 extend from one end of the earpiece 10 that is facing the eardrum to an opposite end of the earpiece 10 that is facing the external environment. The equalization channel 1200 may have a small cross-sectional dimension, such as 0.8 mm in diameter or smaller. In other embodiments, the equalization channel 1200 may be larger than 0.8 mm in cross-sectional dimension.

Figure 12B:
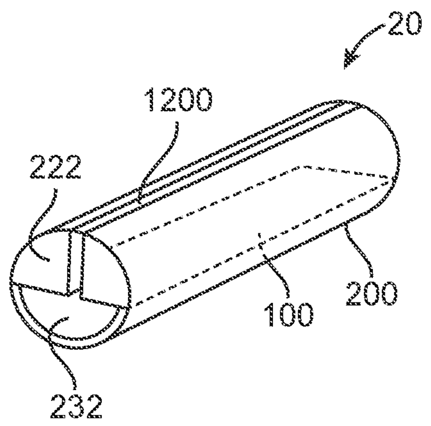
Figure 12C:
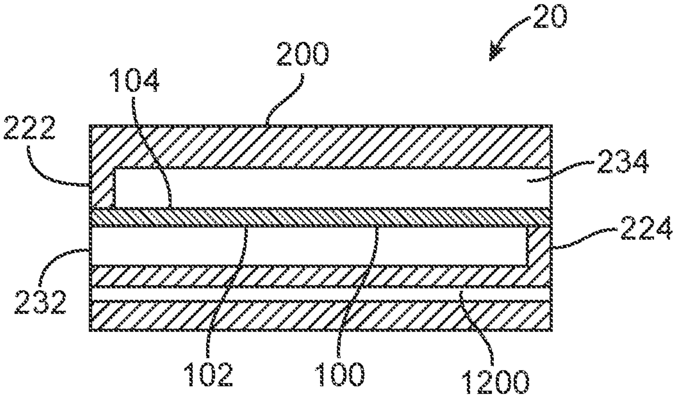

In further embodiments, the component 20 may at least partially define a pressure equalization channel 1200 (FIG. 12B). In the illustrated embodiments, the tube 200 of the component 20 includes an elongated recess defining at an exterior surface of the tube 200 to form the pressure equalization channel 1200. In still further embodiments, the pressure equalization channel 1200 may be formed within a wall of the tube 200 of the component 20 (FIG. 12C).

Figure 12D:
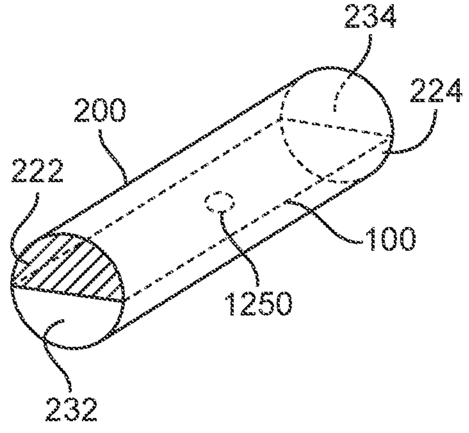

Also, in other embodiments, the diaphragm 100 may include a small hole 1250 for providing pressure equalization (FIG. 12D). The hole 1250 may have a cross-sectional dimension that is less than 0.8 mm. In other embodiments, the hole 1250 may have a cross-sectional dimension that is larger than 0.8 mm. The hole 1250 may be created by piercing the diaphragm 100, by laser cutting the diaphragm 100, by mechanical cutting the diaphragm 100, or by forming the diaphragm 100 to have the hole 1250.

It should be noted that the techniques for providing pressure equalization described with reference to FIGS. 12A-12D may be applied for the embodiments of FIGS. 1-11.

Disclosed are earpieces, hearing aids, and components according to any of the following items and aspects.

Item 1. An earpiece comprising:

a first end;

a second end opposite from the first end;

a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel, wherein the first diaphragm extends in a direction that is parallel to, or that forms an acute angle with, a longitudinal axis of the first channel.

Item 2. Earpiece according to item 1, wherein the direction in which the first diaphragm extends forms a non-perpendicular angle with the longitudinal axis of the first channel.

Item 3. Earpiece according to any of items 1-2, wherein the first channel is configured to reduce an occlusion effect, and/or to provide pressure equalization between a first space in an ear canal and a second space outside the ear canal when the earpiece is worn by a user.

Item 4. Earpiece according to any of items 1-3, wherein the first surface of the diaphragm is water permeable, and wherein the second surface of the diaphragm is water impermeable.

Item 5. Earpiece according to any of items 1-4, wherein the first diaphragm is configured to cope with an air volume velocity that is 10 mmˆ3/s or less.

Item 6. Earpiece according to any of items 1-5, wherein the first diaphragm is a part of a unit that is configured for insertion into an opening of the earpiece.

Item 7. Earpiece according to item 6, wherein the unit comprises a tube having a first tube end, a second tube end, and a tube body extending between the first tube end and the second tube end, wherein the first tube end has a first partial cover, wherein the second tube end has a second partial cover, and wherein the first diaphragm is coupled between the first partial cover at the first tube end and the second partial cover at the second tube end.

Item 8. Earpiece according to any of items 1-7, further comprising a second diaphragm, wherein the first diaphragm and the second diaphragm are tuned to different respective ranges of resonance frequencies.

Item 9. Earpiece according to any of items 1-8, wherein the first diaphragm is tuned to a resonance frequency that is anywhere between 80 Hz to 1000 Hz.

Item 10. Eearpiece according to any of items 1-9, further comprising a receiver.

Item 11. Earpiece according to any of items 1-10, further comprising a first microphone configured to receive sound from an environment, and a processing unit coupled to the first microphone, wherein the processing unit is configured to provide an output signal based on a microphone signal from the first microphone.

Item 12. Earpiece according to item 11, further comprising a second microphone configured to receive ear canal sound, wherein the second microphone is a part of an active occlusion reduction system.

Item 13. Earpiece according to item 12, wherein the active occlusion reduction system is configured to be active above a threshold frequency, and the first diaphragm has a resonance frequency below the threshold frequency.

Item 14. Earpiece according to any of items 12-13, wherein the processing unit comprises an occlusion reduction unit.

Item 15. A hearing aid comprising the earpiece of any of items 1-14, and a behind-the-ear (BTE) unit, wherein the BTE unit comprises a first microphone configured to receive sound from an environment, and a processing unit coupled to the first microphone.

Item 16. H earing aid according to item 15, further comprising a second microphone configured to receive ear canal sound, wherein the second microphone is a part of an active occlusion reduction system.

Item 17. Hearing aid comprising the earpiece of any of items 1-14, and a behind-the-ear (BTE) unit, wherein the BTE unit comprises a first microphone configured to receive sound from an environment, a processing unit coupled to the first microphone, and a receiver coupled to the processing unit.

Item 18. A component for an earpiece, comprising:

a tube having a first tube end, a second tube end, and a tube body extending between the first tube end and the second tube end, wherein the first tube end has a first partial cover, wherein the second tube end has a second partial cover; and a diaphragm is coupled between the first partial cover at the first tube end and the second partial cover at the second tube end;

wherein at least a part of the tube is sized and shaped for insertion into an opening of the earpiece.

Item 19. Component according to item 18, wherein the diaphragm divides a lumen within the tube into a first space and a second space.

Item 20. The component according to item 19, wherein the first space is for fluid communication with a channel in the earpiece when the tube is inserted into the opening of the earpiece.

Aspect 1. An earpiece comprising:

a first end;

a second end opposite from the first end;

a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel, wherein the first diaphragm extends in a direction that is parallel to, or that forms an acute angle with, a longitudinal axis of the first channel.

Aspect 2. The earpiece of aspect 1, wherein the direction in which the first diaphragm extends forms a non-perpendicular angle with the longitudinal axis of the first channel.

Aspect 3. The earpiece of aspect 1, wherein the first channel is configured to reduce an occlusion effect, and/or to provide pressure equalization between a first space in an ear canal and a second space outside the ear canal when the earpiece is worn by a user.

Aspect 4. The earpiece of aspect 1, wherein the first surface of the diaphragm is water permeable, and wherein the second surface of the diaphragm is water impermeable.

Aspect 5. The earpiece of aspect 1, wherein the first diaphragm is configured to cope with an air volume velocity that is 10 mmˆ3/s or less.

Aspect 6. The earpiece of aspect 1, wherein the first diaphragm is a part of a unit that is configured for insertion into an opening of the earpiece.

Aspect 7. The earpiece of aspect 6, wherein the unit comprises a tube having a first tube end, a second tube end, and a tube body extending between the first tube end and the second tube end, wherein the first tube end has a first partial cover, wherein the second tube end has a second partial cover, and wherein the first diaphragm is coupled between the first partial cover at the first tube end and the second partial cover at the second tube end.

Aspect 8. The earpiece of aspect 1, further comprising a second diaphragm, wherein the first diaphragm and the second diaphragm are tuned to different respective ranges of resonance frequencies.

Aspect 9. The earpiece of aspect 1, wherein the first diaphragm is tuned to a resonance frequency that is anywhere between 80 Hz to 1000 Hz.

Aspect 10. The earpiece of aspect 1, further comprising a receiver.

Aspect 11. The earpiece of aspect 10, further comprising a first microphone configured to receive sound from an environment, and a processing unit coupled to the first microphone, wherein the processing unit is configured to provide an output signal based on a microphone signal from the first microphone.

Aspect 12. The earpiece of aspect 11, further comprising a second microphone configured to receive ear canal sound, wherein the second microphone is a part of an active occlusion reduction system.

Aspect 13. The earpiece of aspect 12, wherein the active occlusion reduction system is configured to be active above a threshold frequency, and the first diaphragm has a resonance frequency below the threshold frequency.

Aspect 14. The earpiece of aspect 12, wherein the processing unit comprises an occlusion reduction unit.

Aspect 15. A hearing aid comprising the earpiece of aspect 11, and a behind-the-ear (BTE) unit, wherein the BTE unit comprises a first microphone configured to receive sound from an environment, and a processing unit coupled to the first microphone.

Aspect 16. The hearing aid of aspect 15, further comprising a second microphone configured to receive ear canal sound, wherein the second microphone is a part of an active occlusion reduction system.

Aspect 17. A hearing aid comprising the earpiece of aspect 1, and a behind-the-ear (BTE) unit, wherein the BTE unit comprises a first microphone configured to receive sound from an environment, a processing unit coupled to the first microphone, and a receiver coupled to the processing unit.

Aspect 18. A component for an earpiece, comprising:

a tube having a first tube end, a second tube end, and a tube body extending between the first tube end and the second tube end, wherein the first tube end has a first partial cover, wherein the second tube end has a second partial cover; and a diaphragm is coupled between the first partial cover at the first tube end and the second partial cover at the second tube end;

wherein at least a part of the tube is sized and shaped for insertion into an opening of the earpiece.

Aspect 19. The component of aspect 18, wherein the diaphragm divides a lumen within the tube into a first space and a second space.

Aspect 20. The component of aspect 19, wherein the first space is for fluid communication with a channel in the earpiece when the tube is inserted into the opening of the earpiece.

Although particular exemplary hearing devices have been shown and described, it will be understood that it is not intended to limit the claimed inventions to the exemplary hearing devices, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. An earpiece comprising:

a first end;

a second end opposite from the first end;

a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel;

wherein the first channel has a rectilinear part, and wherein the first surface of the first diagram is parallel to, or forms an acute angle with, a longitudinal axis of the rectilinear part of the first channel.

2. The earpiece of claim 1, wherein the first diaphragm extends in a direction that is parallel to, or that forms an acute angle with, the longitudinal axis of the first channel.

3. The earpiece of claim 2, wherein the direction in which the first diaphragm extends forms a non-perpendicular angle with the longitudinal axis of the first channel.

4. The earpiece of claim 1, wherein the first channel is configured to reduce an occlusion effect, and/or to provide pressure equalization between a first space in an ear canal and a second space outside the ear canal when the earpiece is worn by a user.

5. The earpiece of claim 1, wherein the first surface of the diaphragm is water permeable.

6. The earpiece of claim 1, wherein the second surface of the diaphragm is water impermeable.

7. The earpiece of claim 1, wherein the first diaphragm is configured to cope with an air volume velocity that is 10 mm^3/s or less.

8. The earpiece of claim 1, wherein the first diaphragm is a part of a unit that is configured for insertion into an opening of the earpiece.

9. The earpiece of claim 1, further comprising a second diaphragm, wherein the first diaphragm and the second diaphragm are tuned to different respective ranges of resonance frequencies.

10. The earpiece of claim 1, wherein the first diaphragm is tuned to a resonance frequency that is anywhere between 80 Hz to 1000 Hz.

11. The earpiece of claim 1, further comprising a receiver.

12. The earpiece of claim 11, further comprising a first microphone configured to receive sound from an environment, and a processing unit coupled to the first microphone, wherein the processing unit is configured to provide an output signal based on a microphone signal from the first microphone.

13. The earpiece of claim 12, further comprising a second microphone configured to receive ear canal sound, wherein the second microphone is a part of an active occlusion reduction system.

14. The earpiece of claim 13, wherein the active occlusion reduction system is configured to be active above a threshold frequency, and the first diaphragm has a resonance frequency below the threshold frequency.

15. The earpiece of claim 12, wherein the processing unit comprises an occlusion reduction unit.

16. A hearing aid comprising the earpiece of claim 1, and a behind-the-ear (BTE) unit, wherein the BTE unit comprises a first microphone configured to receive sound from an environment, and a processing unit coupled to the first microphone.

17. The hearing aid of claim 16, further comprising a second microphone configured to receive ear canal sound, wherein the second microphone is a part of an active occlusion reduction system.

18. A hearing aid comprising the earpiece of claim 1, and a behind-the-ear (BTE) unit, wherein the BTE unit comprises a first microphone configured to receive sound from an environment, a processing unit coupled to the first microphone, and a receiver coupled to the processing unit.

19. The earpiece of claim 1, wherein the first end is configured to face towards an eardrum, and wherein the first diaphragm is located closer to the second end than to the first end of the earpiece.

20. The earpiece of claim 1, wherein the earpiece includes a receiver, or is a part of a hearing device that includes the receiver.

21. The earpiece of claim 1, wherein the earpiece is configured to couple to a first end of a sound tube, the sound tube having a second end coupled to a speaker.

22. An earpiece comprising:

a first end;

a second end opposite from the first end;

a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel;

wherein the first diaphragm is not a part of any speaker;

wherein the first diaphragm is a part of a unit that is configured for insertion into an opening of the earpiece; and wherein the unit comprises a tube having a first tube end, a second tube end, and a tube body extending between the first tube end and the second tube end, wherein the first tube end has a first partial cover, wherein the second tube end has a second partial cover, and wherein the first diaphragm is coupled between the first partial cover at the first tube end and the second partial cover at the second tube end.

23. An earpiece comprising:

a first end;

a second end opposite from the first end;

a first channel extending from a first location that is closer to the first end than to the second end, to a second location that is closer to the second end than to the first end; and a first diaphragm, wherein the first diaphragm has a first surface and a second surface opposite the first surface, the first surface of the diaphragm configured to be in fluid communication with a lumen in the first channel;

wherein the earpiece comprises only one speaker;

wherein the first diaphragm is outside the only one speaker of the earpiece; and wherein the first channel has a rectilinear part, and wherein the first surface of the first diagram is parallel to, or forms an acute angle with, a longitudinal axis of the rectilinear part of the first channel.

* * * * *